US009164711B2

(12) United States Patent
Mori (10) Patent No.: US 9,164,711 B2
(45) Date of Patent: Oct. 20, 2015

(54) NETWORK PRINTING SYSTEM AND NETWORK PRINTING PROGRAM ADAPTED TO EXECUTE PRINTING FROM A MOBILE TERMINAL TO A PRINTER BY USING WIRELESS COMMUNICATION

(71) Applicant: STAR MICRONICS CO., LTD., Shizuoka (JP)

(72) Inventor: Yuji Mori, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 14/618,026

(22) Filed: Feb. 10, 2015

(65) Prior Publication Data
US 2015/0153975 A1 Jun. 4, 2015

Related U.S. Application Data

(63) Continuation of application No. PCT/JP2013/078507, filed on Oct. 22, 2013.

(30) Foreign Application Priority Data

Nov. 8, 2012 (JP) ................................. 2012-245998

(51) Int. Cl.
*G06K 15/00* (2006.01)
*G06F 3/12* (2006.01)
(Continued)

(52) U.S. Cl.
CPC ............ *G06F 3/1222* (2013.01); *G06F 3/1204* (2013.01); *G06F 3/1206* (2013.01); *G06F 3/1238* (2013.01); *G06F 3/1289* (2013.01);
(Continued)

(58) Field of Classification Search
CPC ... G06F 3/1222; G06F 3/1204; G06F 3/1206; G06F 3/1238; G06F 3/1289; G06F 3/1292; H04W 12/06; H04W 12/12; H04L 63/0492
USPC ........ 358/1.13, 1.4, 1.15, 1.18, 402; 709/201, 709/203, 229, 234, 244; 370/328, 401
See application file for complete search history.

(56) References Cited

U.S. PATENT DOCUMENTS 7,272,647 B2 * 9/2007 Haraguchi et al. .... G06F 3/1203
358/1.14
7,460,261 B2 * 12/2008 Itoh ....................... G06F 3/1204
358/1.15
(Continued)

FOREIGN PATENT DOCUMENTS

JP 2003-330639 11/2003
JP 2005-327110 11/2005
(Continued)

*Primary Examiner* — Gabriel Garcia
(74) *Attorney, Agent, or Firm* — Lex IP Meister, PLLC (57) ABSTRACT

A desired printer can be reliably selected and the setting of which printer is permitted to communicate with which mobile terminal can be easily altered. A mobile terminal acquires printer identification information from a printer by NFC communication, and transmits the printer identification information and mobile terminal identification information to a server, thereby requesting an authentication. The mobile terminal transmits print data to the printer to instruct a printing execution when the authentication is successful. Therefore, the desired printer can be reliably selected by placing the mobile terminal close to the desired printer. Any stolen mobile terminal can be disabled for any printer only by rewriting the centrally managed information on the server.

6 Claims, 10 Drawing Sheets

(51) Int. Cl.
*H04W 12/06* (2009.01)
*H04L 29/06* (2006.01)
*H04W 12/12* (2009.01)

(52) U.S. Cl.
CPC ............. *G06F 3/1292* (2013.01); *H04W 12/06* (2013.01); *H04L 63/0492* (2013.01); *H04W 12/12* (2013.01)

(56) References Cited

U.S. PATENT DOCUMENTS

| | | | | |
|---|---|---|---|---|
| 2003/0142345 A1* | 7/2003 | Bunn | ................... | G06F 3/1204 358/1.15 |
| 2005/0086171 A1* | 4/2005 | Abe | ....................... | G06Q 30/06 705/51 |
| 2008/0084578 A1* | 4/2008 | Walker | ................... | G06F 3/1204 358/1.15 |
| 2012/0026536 A1* | 2/2012 | Shah | ....................... | G06F 3/1206 358/1.15 |
| 2013/0145420 A1* | 6/2013 | Ting | ........................ | H04L 63/08 726/1 |
| 2014/0055806 A1* | 2/2014 | Furukawa | ............. | G06F 3/1293 358/1.14 |

FOREIGN PATENT DOCUMENTS

| | | |
|---|---|---|
| JP | 2006-244321 | 9/2006 |
| JP | 2007-87308 | 4/2007 |
| JP | 2008-181217 | 8/2008 |
| JP | 2010-74420 | 4/2010 |
| JP | 2010-241114 | 10/2010 |

\* cited by examiner

| NO | NAME | IP ADDRESS |
|----|------|------------|
| 1 | AAA | xxx.xxx.xx.111 |
| 2 | BBB | xxx.xxx.xx.112 |
| 3 | CCC | xxx.xxx.xx.113 |
| 4 | DDD | xxx.xxx.xx.114 |
| ⋮ | ⋮ | ⋮ |

FIG. 3B

| NO | SERIAL NUMBER |
|----|---------------|
| 1 | abc123 |
| 2 | def456 |
| 3 | ghi789 |
| 4 | jkl012 |
| ⋮ | ⋮ |

FIG. 3C

| NO | PRINTER | | MOBILE TERMINAL |
|---|---|---|---|
| | NAME | IP ADDRESS | SERIAL NUMBER |
| 1 | AAA | xxx.xxx.xx.111 | abc123 |
| | | | jkl012 |
| 2 | BBB | xxx.xxx.xx.112 | abc123 |
| | | | ghi789 |
| ⋮ | ⋮ | ⋮ | ⋮ |

| NO | CLERK ID INFO | MOBILE TERMINAL SERIAL NUMBER | ATTENDANCE INFO |
|---|---|---|---|
| 1 | NM0001 | abc123 | ATTENDANCE |
| 2 | NM0002 | def456 | VACATION |
| 3 | NM0003 | ghi789 | ATTENDANCE |
| 4 | NM0004 | jkl012 | LEAVING |
| ⋮ | ⋮ | ⋮ | ⋮ |

FIG. 9

| NO | PRINTER | | MOBILE TERMINAL | AVAILABILITY INFO |
|---|---|---|---|---|
| | NAME | IP ADDRESS | SERIAL NUMBER | |
| 1 | AAA | xxx.xxx.xx.111 | abc123 | AVAILABLE |
| | | | jkl012 | UNAVAILABLE |
| 2 | BBB | xxx.xxx.xx.112 | abc123 | AVAILABLE |
| | | | ghi789 | AVAILABLE |
| ⋮ | ⋮ | ⋮ | ⋮ | ⋮ |

NETWORK PRINTING SYSTEM AND NETWORK PRINTING PROGRAM ADAPTED TO EXECUTE PRINTING FROM A MOBILE TERMINAL TO A PRINTER BY USING WIRELESS COMMUNICATION

CROSS-REFERENCE TO RELATED APPLICATION

The present application is a continuation of PCT Application No. PCT/JP2013/078507, filed on Oct. 22, 2013, which claims priority to and the benefit of Japanese Patent Application No. 2012-245998 filed on Nov. 8, 2012, the entire contents of which are incorporated herein by reference.

BACKGROUND (a) Field

The present invention generally relates a network printing system and a network printing program. In particular, the present invention is suitable to be used for a network printing system that is adapted to execute printing by transmitting print data from a mobile terminal to a printer by using a short-range wireless communication technology.

(b) Description of the Related Art

Recently, portable tablet devices and smart phones (hereinafter referred to as "mobile terminals") have been widespread, so many clerks of stores are carrying the mobile terminals for performing the settlement process. That is, by placing printers in a plurality of locations in the store and connecting the mobile terminal to any printer, the settlement process can be performed and the receipt or the like can be issued from a printer of any location. Since the mobile terminal is capable of being carried, a wireless connection is preferable rather than a wired connection when the mobile terminal is connected to the printer.

Here, it is required to use a printer, which is not used (or occupied), for the settlement to reduce the customer's waiting time at the time of settlement. That is, the printer to be used when the clerk to issue the receipt may be different for each settlement. Therefore, the mobile terminal carried by each clerk does not need to always establish a connection with the same printer. Accordingly, it is required that the clerk can connect his or her own mobile terminal to a desired printer as necessary.

In accordance with such a demand, the conventional technology displays an available printer list on a display screen of the mobile terminal and selects a printer that the user wants to use in the list, thereby establishing a communication between the selected printer and the mobile terminal. According to this technique, the user can freely select the printer that the user wants to use.

However, simply displaying the available printer list on the mobile terminal cannot provide information about where printers of the available printer list are installed. For example, if a plurality of printers of the same model are installed side by side, it is not clear which printer outputs the receipt when a certain printer is selected from the available printer list.

Another conventional technology exchanges information between the mobile terminal and the printer by NFC (Near Field Communication) communication, thereby establishing the communication between the mobile terminal and the printer (for example, Japanese Patent Application Publication No. 2010-241114). Because the communication distance of NFC is less than 10 cm, it is necessary to place the mobile terminal physically close to a desired printer for the printing. Therefore, the technology for establishing the communication using NFC can clarify that the user wants to communicate with which printer.

In a system described in Japanese Patent Application Publication No. 2010-241114, only one printer capable of NFC communication (hereinafter referred to as "a NFC compatible printer") is provided. The other printers are connected on the NFC compatible printer via the network. Therefore, when printing is executed on the printer other than the NFC compatible printer according to an instruction from the mobile terminal, it is necessary to send print data to the other printer through the NFC compatible printer. In this case, if the printers connected to the network are the same model, it is not clear that the printing is executed by which printer on the network when the mobile terminal selects a certain printer.

In Japanese Patent Application Publication No. 2010-241114, if all of the printers connected to the network are replaced with the NFC compatible printers, it may be clear that the mobile terminal communicates with which printer. However, in this case, the following problem can occur. Japanese Patent Application Publication No. 2010-241114 discloses that the printer stores model IDs (usage IDs) of the mobile terminals on which the communication is permitted in order to restrict the mobile terminals that can use the printer. The printer determines whether the mobile terminal is permitted based on the model ID when performing the NFC communication. In this case, when all of the printers disclosed in Japanese Patent Application Publication No. 2010-241114 are replaced with the NFC compatible printers, it is necessary to store the model IDs of the mobile terminals in each of printers. Therefore, there is a problem that it takes a lot of time to store the model IDs in all of the printers.

In particular, it may be a problem if the mobile terminal used by the clerk in the store is stolen. In this case, the model ID of the stolen mobile terminal is stored as the usage ID of the communication enabled mobile terminal in each printer. Therefore, in order to disable the stolen mobile terminal, settings for the model IDs of the mobile terminals stored in each printer must be changed. It may also be a problem if the clerks are rearranged or recruited. In order to alter the setting of which printer is permitted to communicate with which mobile terminal, the settings for the model IDs of the mobile terminals stored in each printer must be changed. Such change of the settings would considerably increase the workload.

SUMMARY

An embodiment of the present invention is provided to solve the above described problems. An embodiment of the present invention enables a user to reliably select a desired printer, and enables the easy alteration of the setting of which printer is permitted to communicate with which mobile terminal.

In order to solve the above described problems, in an embodiment of the present invention, a mobile terminal acquires printer identification information from a printer and transmits to a server the printer identification information and mobile terminal identification information identifying the mobile terminal itself, thereby performing an authentication request. The mobile terminal receives an authentication result from the server, and transmits, when the authentication is successful, print data to the printer to instruct a printing execution. Here, matching information, which is used to perform the authentication, of the printer identification information and the mobile terminal identification information is stored in the server. Matching information indicates which mobile terminal is permitted to communicate with which printer.

According to an embodiment of the present invention, when the mobile terminal transmits the print data to a desired printer to execute printing, information necessary for requesting an authentication is acquired from the desired printer. Therefore, even if a plurality of printers of the same model are located side by side, a user can reliably select a desired printer.

Further, according to an embodiment of the present invention, when the mobile terminal transmits the print data to the printer to execute printing, information necessary for performing an authentication is centrally managed on the server. Therefore, there is no need to store model IDs of permitted mobile terminals in each of printers. Workload for storing the model IDs can be therefore omitted. Further, the setting of which printer is permitted to communicate with which mobile terminal can be easily altered by rewriting information that is centrally managed on the server.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 1:
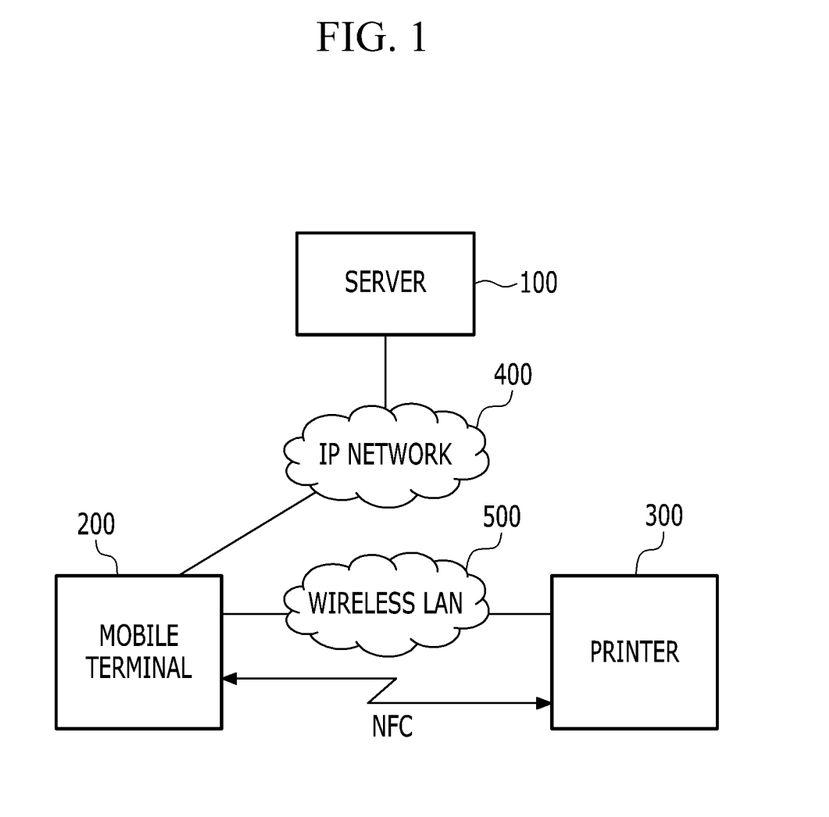
FIG. 1 is a schematic diagram exemplifying a configuration of a network printing system according to an embodiment of the present invention.

An embodiment of the present invention is described with reference to the drawings. FIG. 1 is a schematic diagram exemplifying a network printing system according to an embodiment of the present invention. As shown in FIG. 1, a network printing system according to the embodiment of the present invention includes a server 100, a mobile terminal 200, and a printer 300. The server 100 and the mobile terminal 200 are connectable to each other via an Internet Protocol (IP) network 400 such as an internet. Further, the mobile terminal 200 and the printer 300 are connectable to each other via a wireless Local Area Network (LAN) 500, and can wirelessly communicate with each other via a short-range wireless communication. Hereinafter, the short-range wireless communication is exemplified as Near Field Communication (NFC).

While only one mobile terminal 200 and one printer 300 are shown in FIG. 1, a plurality of mobile terminals 200 and a plurality of printers 300 may actually exist. The plurality of mobile terminals 200 are connectable to the server 100 via the IP network 400. Further, the plurality of mobile terminals 200, via the wireless LAN 500, are connectable to one that is arbitrarily selected from among the plurality of printers 300.

Figure 2:
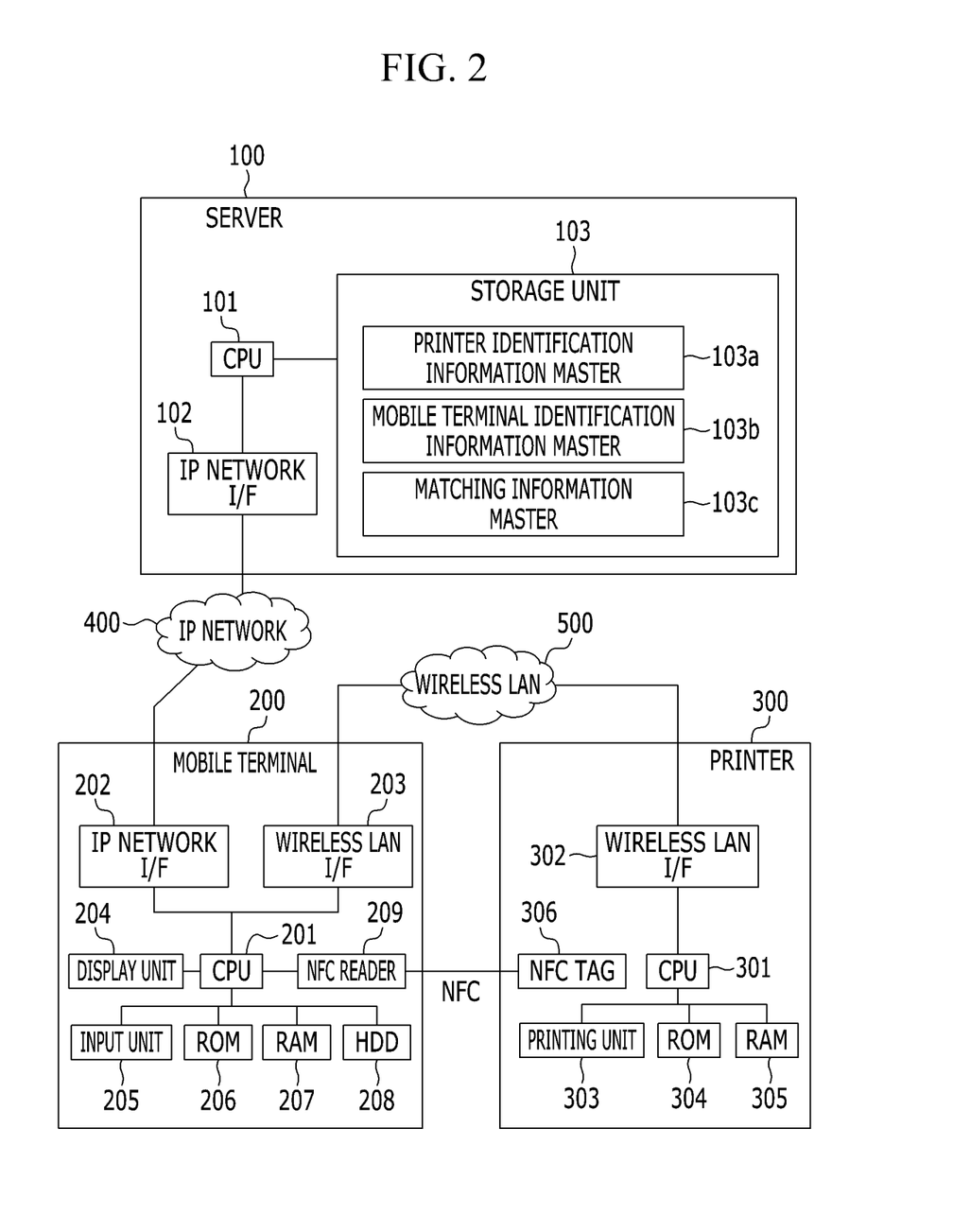
FIG. 2 is a block diagram exemplifying a network printing system according to an embodiment of the present invention.

FIG. 2 is a block diagram exemplifying a network printing system according to an embodiment of the present invention. As shown in FIG. 2, the server 100, as its hardware structure, includes a processor 101, an IP network interface 102, and a storage unit 103. The processor 101 may include one or more physical processors, and the physical processor may be for example a Central Processing Unit (CPU). Hereinafter, it is assumed that the processor 101 is the CPU. The storage unit 103 may include for example a hard disk. The storage unit 103 stores a printer identification information master 103a, a mobile terminal identification information master 103b, and a matching information master 103c.

Figure 3A:
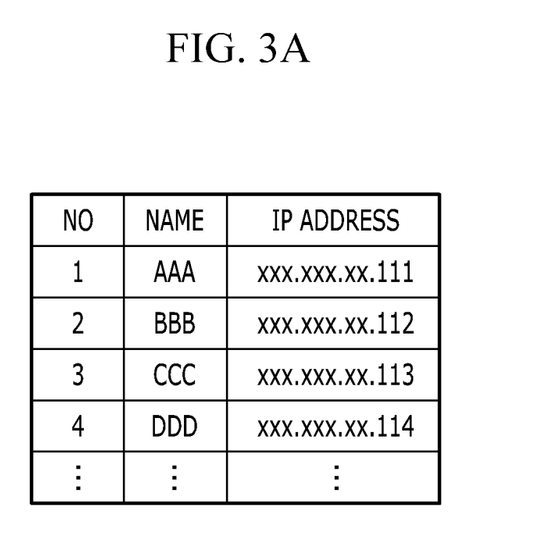
FIG. 3A is a diagram showing an example of a printer identification information master stored in a storage unit according to an embodiment of the present invention.
Figure 3B:
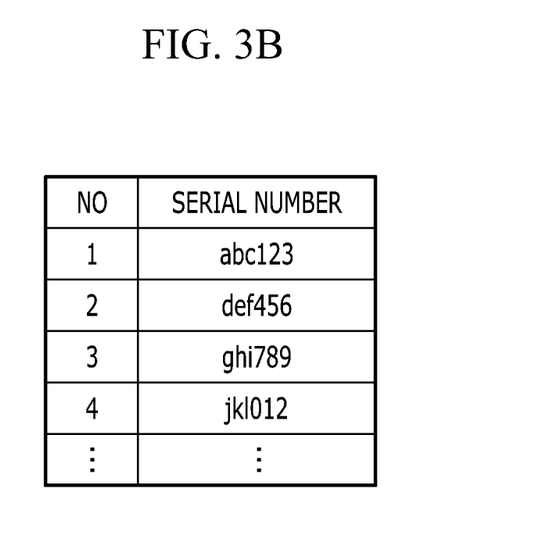
FIG. 3B is a diagram showing an example of a mobile terminal identification information master stored in a storage unit according to an embodiment of the present invention.
Figure 3C:
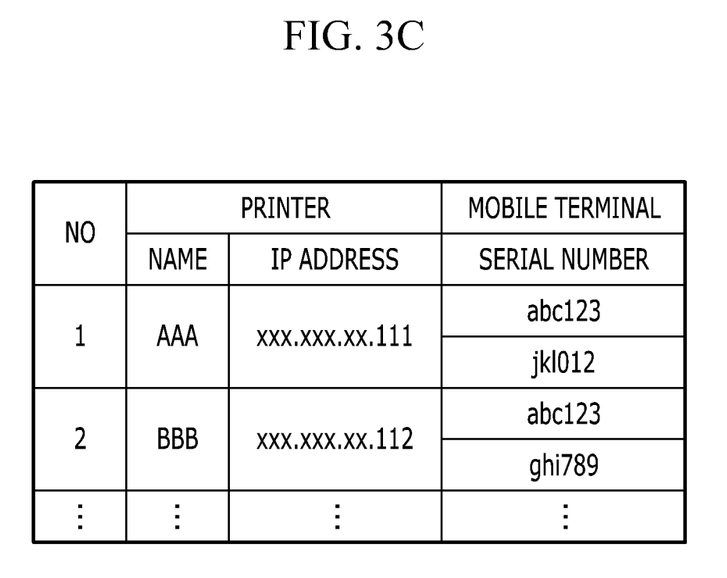
FIG. 3C is a diagram showing an example of a matching information master stored in a storage unit according to an embodiment of the present invention.

FIG. 3A is a diagram showing an example of the printer identification information master 103a stored in the storage unit 103, FIG. 3B is a diagram showing an example of the mobile terminal identification information master 103b stored in the storage unit 103, and FIG. 3C is a diagram showing an example of the matching information master 103c stored in the storage unit 103. As shown in FIG. 3A, an example of the printer identification information master 103a stores names and IP addresses of the printers 300 which can be connected to the mobile terminals 200 on the wireless LAN 500, in accordance with ascending order of record numbers. Here, the name of the printer 300 corresponds to "printer identification information" of the present embodiment, and the IP address of the printer 300 corresponds to "address information" of the present embodiment.

As shown in FIG. 3B, an example of the mobile terminal identification information master 103b stores serial numbers of the mobile terminals 200 connected to the IP network 400 in accordance with ascending order of record numbers. Here, the serial number of the mobile terminal 200 corresponds to "mobile terminal identification information" in the present embodiment.

Further, as shown in FIG. 3C, an example of the matching information master 103c stores the names (for example, printer identification information) and the IP addresses (for example, address information) of the printers 300 in association with the serial number(s) (for example, mobile terminal identification information) of one or more mobile terminals 200 permitted to communicate with a corresponding printer 300, in accordance with ascending order of record numbers. The storage unit 103 storing the matching information master 103c corresponds to matching information storage unit of the present embodiment.

Referring to FIG. 2 again, the mobile terminal 200 includes, as its hardware structure, a processor 201, an IP network interface 202, a wireless LAN interface 203, a display unit 204, an input unit 205, a ROM (Read Only Memory) 206, a RAM (Random Access Memory) 207, a storage unit 208, and an NFC reader 209. The processor 101 may include one or more physical processors, and the physical processor may be for example a CPU. Hereinafter, it is assumed that the processor 201 is the CPU. The display unit 204 may be for example a liquid crystal display or an organic light emitting display. The input unit 205 may include for example a touch panel. The storage unit 208 may include for example a hard disk or a memory.

The printer 300 includes a processor 301, a wireless LAN interface 302, a printing unit 303, a ROM 304, a RAM305, and an NFC tag 306. The processor 301 may include one or more physical processors, and the physical processor may be for example a CPU. Hereinafter, it is assumed that the processor 301 is the CPU. The NFC tags 306 stores its own printer identification information (for example, a name of the printer 300) in an embedded memory. The NFC tag 306 may be for example a seal type tag that is adhered to a surface of a housing of the printer 300. The NFC tag 306 corresponds to a printer identification information storage unit of the present embodiment.

Figure 4:
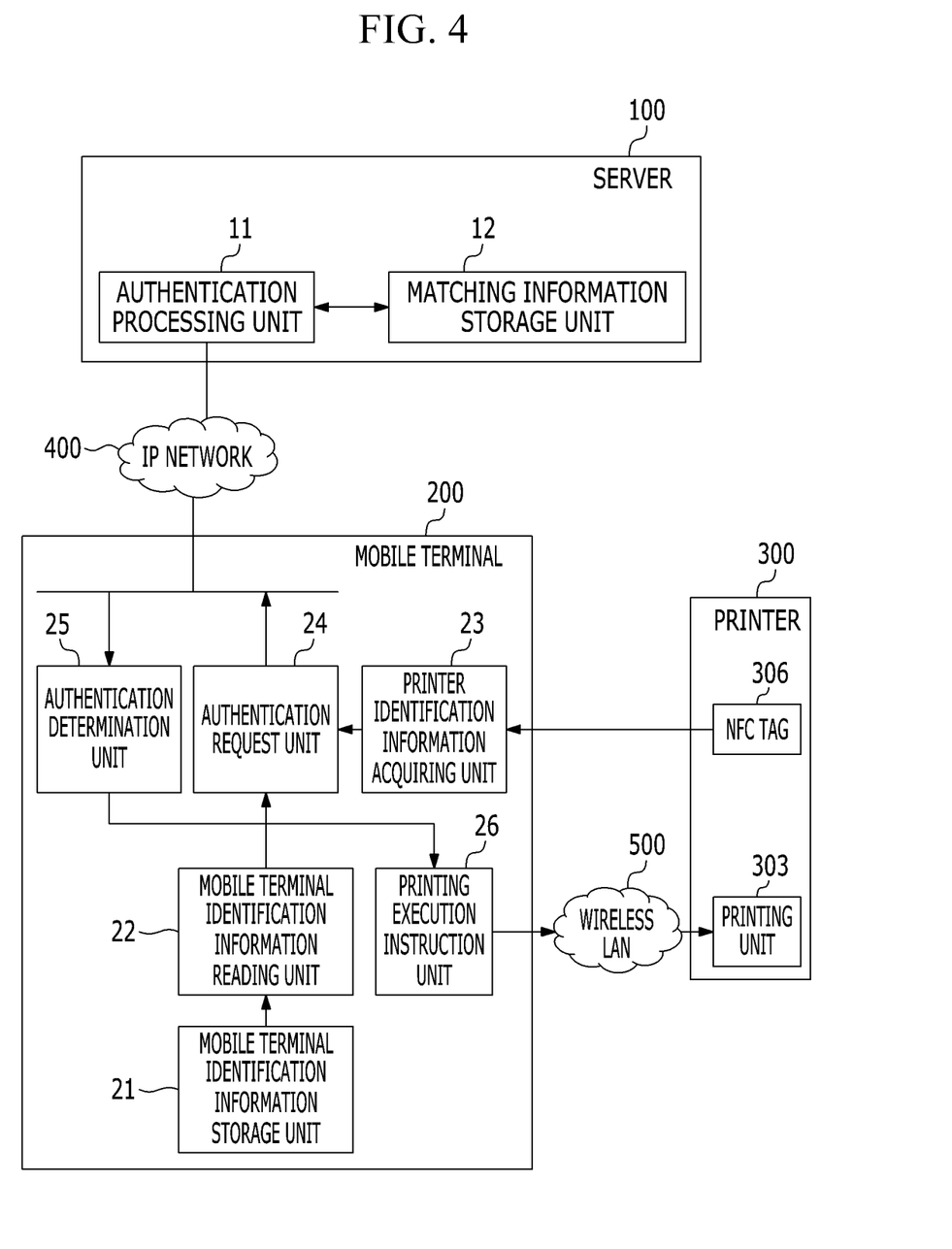
FIG. 4 is a block diagram exemplifying a functional structure of a network printing system according to an embodiment of the present invention.

FIG. 4 is a block diagram exemplifying a functional structure of a network printing system according to an embodiment of the present invention. In FIG. 4, only a main functional structure of the server 100 and the mobile terminal 200 according to an operation of the present embodiment. For the printer 300, a part of the hardware structure shown in FIG. 3 is shown.

As shown in FIG. 4, the server 100 includes, as its functional structure, an authentication processing unit 11 and a matching information storage unit 12. Further, the mobile terminal 200 includes, as its functional structure, a mobile terminal identification information storage unit 21, a mobile terminal identification information reading unit 22, a printer identification information acquiring unit 23, an authentication request unit 24, an authentication determination unit 25, and a printing execution instruction unit 26.

In one embodiment, at least part of functions of the mobile terminal identification information reading unit 22, the printer identification information acquiring unit 23, the authentication request unit 24, the authentication determination unit 25, and the printing execution instruction unit 26 may be realized by software. That is, at least part of the functions of these units 22 to 26 may be realized by operations of a network printing program stored in a recording medium such as the ROM 206, the RAM207 or the storage unit 208 under control of the CPU 201. In a certain embodiment, the network printing program may include at least part of a mobile terminal identification information reading module, a printer identification information acquiring module, an authentication request module, an authentication determination module, and a printing execution instruction module which correspond to the mobile terminal identification information reading unit 22, the printer identification information acquiring unit 23, the authentication request unit 24, the authentication determination unit 25, and the printing execution instruction unit 26, respectively.

The matching information storage unit 12 of the server 100 stores the matching information master 103c that associates the printer identification information with the mobile terminal identification information representing one or more mobile terminals 200 permitted to communicate with the printer 300 corresponding to the printer identification information. For example, the storage unit 103 shown in FIG. 2 corresponds to the matching information storage unit 12.

The mobile terminal identification information storage unit 21 of the mobile terminal 200 stores the mobile terminal identification information (for example, the serial number of the mobile terminal 200) for identifying the mobile terminal 200 itself. For example, the ROM 206 or storage unit 208 shown in FIG. 2 corresponds to the mobile terminal identification information storage unit 21. The mobile terminal identification information reading unit 22 reads the mobile terminal identification information from the mobile terminal identification information storage unit 21.

The printer identification information acquiring unit 23 acquires the printer identification information (for example, the name) of the printer 300 stored in the NFC tag 306 (for example, the printer identification information storage unit) by NFC communication. For example, the NFC reader 209 shown in FIG. 2 corresponds to the printer identification information acquiring unit 23.

In general, the communication distance of NFC is less than 10 cm. Accordingly, the mobile terminal 200 is required to be placed close to the printer 300 in order to allow the printer identification information acquiring unit 23 (for example, the NFC reader 209) to acquire the printer identification information from the NFC tag 306. That is, the NFC reader 209 can acquire the printer identification information from the NFC tag 306 by placing the mobile terminal 200 close to the NFC tag 306 of the printer 300.

Therefore, a selection of the printer 300 to be used for printing is performed by placing the mobile terminal 200 close to the desired printer 300. Even when a plurality of printers 300 are arranged side by side, since the communication distance of NFC is very short, for example less than 10 cm, one specific printer 300 can be reliably selected.

The authentication request unit 24 transmits to the server 100 via the IP network 400 the mobile terminal identification information read from the mobile terminal identification information storage unit 21 and the printer identification information acquired from the printer 300 by the printer identification information acquiring unit 23, to request the authentication.

The authentication processing unit 11 of the server 100, in response to the authentication request by the authentication request unit 24, performs the authentication by comparing the combination of the mobile terminal identification information and the printer identification information transmitted from the mobile terminal 200 along with the authentication request with the combination of the mobile terminal identification information and the printer identification information stored in the matching information storage unit 12 of the server 100. The authentication processing unit 11 transmits the authentication result to the mobile terminal 200 in return.

That is, the authentication processing unit 11 determines whether the same combination of the mobile terminal identification information and the printer identification information is stored in the matching information storage unit 12. The authentication processing unit 11 transmits to the mobile terminal 200 the authentication result of "permission" when the same combination is stored, and the authentication result of "rejection" when the same combination is not stored.

If the authentication result is "permission", the authentication processing unit 11 further returns the IP address of the permitted printer 300 together with the authentication result. In this case, the IP address is stored in the matching information storage unit 12 in association with the printer identification information of the permitted printer 300.

The authentication determination unit 25 determines whether the authentication is successful, based on the authentication result that is returned from the server 100 in response to the authentication request of the authentication request unit 24. In a certain embodiment, if the authentication determination unit 25 determines that the authentication has failed, it displays a notification of the failure on the display unit 204 shown in FIG. 2.

On the other hand, if the authentication determination unit 25 determines that the authentication succeeds, the printing execution instruction unit 26, via the wireless LAN 500, transmits print data to the printer 300 identified by the IP address that is returned together with the authentication result by the authentication processing unit 11 (for example, the printer 300 corresponding to the printer identification information acquired by the printer identification information acquiring unit 23), thereby instructing a printing execution. The printing unit 303 of the printer 300 executes printing when receiving the instruction.

Figure 5:
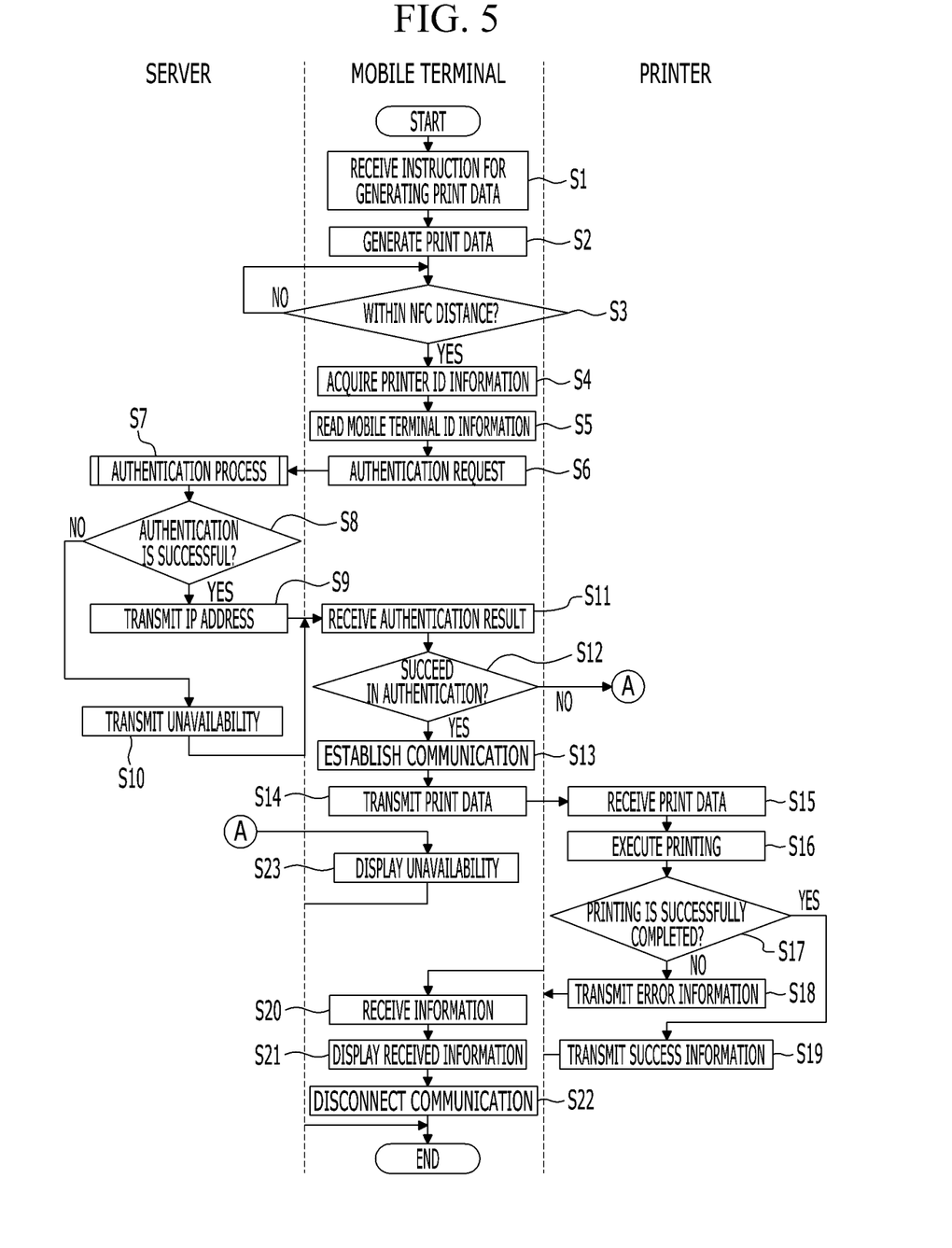
FIG. 5 is a flowchart showing an operation example of a network printing system according to an embodiment of the present invention.

FIG. 5 is a flowchart showing an operation example of a network printing system according to an embodiment of the present invention. Referring to FIG. 5, when receiving an instruction for generating the print data through the input unit 205 of the mobile terminal 200 from a user (step S1), the CPU 201 generates the print data (step S2), and temporarily stores the print data in the RAM 207.

Then, the NFC reader 209 (for example, the printer identification information acquiring unit 23) of the mobile terminal 200 determines whether it is close to the NFC tag 306 of the printer 300 within a distance for enabling NFC communication (step S3). Upon being brought close to the NFC tag 306 within the communication distance of NFC, the NFC reader 209 acquires the printer identification information stored in the NFC tag 306 by NFC communication (step S4).

In addition, the mobile terminal identification information reading unit 22 reads the mobile terminal identification information from the mobile terminal identification information storage unit 21 (step S5). Then, the authentication request unit 24 transmits to the server 100 via the IP network 400 the mobile terminal identification information read from the mobile terminal identification information storage unit 21 and the printer identification information acquired from the NFC tag 306 by the printer identification information acquiring unit 23, thereby requesting the authentication (step S6).

Figure 6:
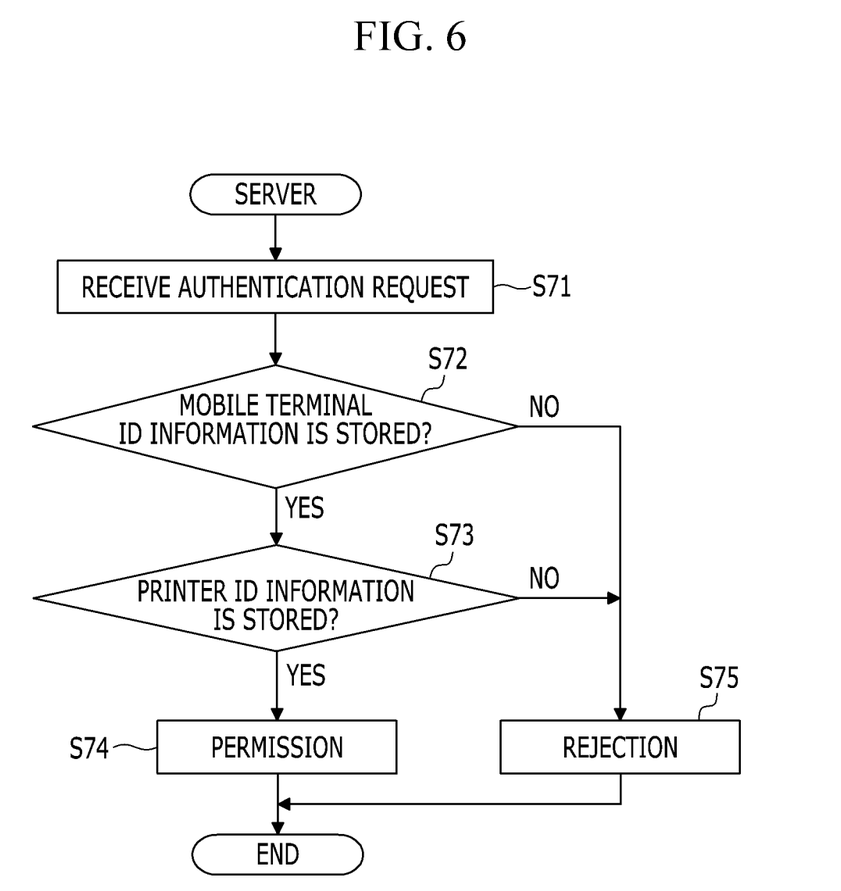
FIG. 6 is a flowchart showing an operation example of an authentication process by an authentication proceeding unit according to an embodiment of the present invention.

The authentication processing unit 11 of the server 100 performs the authentication in response to the authentication request by the authentication request unit 24 (step S7). FIG. 6 is a flowchart showing an operation example of an authentication process. The authentication processing unit 11 receives the authentication request containing the mobile terminal identification information and the printer identification information from the mobile terminal 200 (step S71).

The authentication processing unit 11 determines whether the received mobile terminal identification information is stored in the matching information storage unit 12 (step S72). When determining that the received mobile terminal identification information is stored in the matching information storage unit 12, the authentication processing unit 11 determines whether the printer identification information, which is received in association with the mobile terminal identification information from the mobile terminal 200, is stored in the matching information storage unit 12 (step S73).

Here, upon determining that the printer identification information, which is received in association with the mobile terminal identification information from the mobile terminal 200, is stored in the matching information storage unit 12, the authentication processing unit 11 sets the authentication result to "permission" (step S74). Thereafter, the process proceeds to step S8 of FIG. 5.

On the other hand, if it is determined in step S72 that the mobile terminal identification information received from the mobile terminal 200 is not stored in the matching information storage unit 12, or if it is determined in step S73 that the printer identification information received from the mobile terminal 200 is not stored, in association with the mobile terminal identification information received from the same mobile terminal 200, in the matching information storage unit 12, the authentication processing unit 11 sets the authentication result to "rejection" (step S75). Thereafter, the process proceeds to step S8 of FIG. 5.

The authentication processing unit 11 determines whether the authentication result is "permission" or "rejection" (step S8). When the authentication result is "permission," the authentication processing unit 11 transmits (returns) to the mobile terminal 200 the authentication result of "permission" together with the IP address of the printer 300 (step S9). On the other hand, when the authentication result is "rejection," the authentication processing unit 11 transmits (returns) to the mobile terminal 200 the authentication result of "rejection" together with information indicating unavailability of the printer 300 (step S10).

The authentication determination unit 25 of the mobile terminal 200 receives the information returned from the server 100 in step S9 or step S10 (step S11). Then, the authentication determination unit 25 determines whether the authentication is successful based on the received information (step S12).

Here, if the authentication determination unit 25 determines that the authentication is successful, the printing execution instruction unit 26 controls the wireless LAN interface 203 to establish a communication of wireless LAN 500 between the mobile terminal 200 and the printer 300 identified by the IP address that is received from the server 100 together with the authentication result of "permission" (step 13). The printing execution instruction unit 26 transmits the print data to the corresponding printer 300 to instruct the printing execution (step 14).

The printing unit 303 of the printer 300 receives the print data from the mobile terminal 200 (step S15), and executes printing (step S16). Further, the printing unit 303 determines whether the printing has been successfully completed (step S17). Here, when the printing has ended in failure, the printing unit 303 sends error information to the mobile terminal 200 via the wireless LAN500 (step S18). When the printing has been successfully completed, the printing unit 303 transmits success information to the mobile terminal 200 (step S19).

The mobile terminal 200 receives the error information or the success information from the printer 300 (step S20), and displays the received information on the display unit 204 (step S21). Next, the wireless LAN interface 203 disconnects the communication established between the mobile terminal 200 and the printer 300 (step S22). Accordingly, the process of the flowchart exemplified in FIG. 5 ends.

In the above step S12, if the authentication determination unit 25 determines that the authentication fails, the authentication determination unit 25 displays on the display unit 204 the information indicating unavailability of the printer 300 (that is received from the server 100 together with the authentication result of "rejection") (step S23). Accordingly, the process of the flowchart exemplified in FIG. 5 ends. In a certain embodiment, the information indicating unavailability of the printer 300 may be image data stored in the server 100 in advance, or may be command data for displaying image data stored in the mobile terminal 200.

As described above in detail, in the present embodiment, the mobile terminal 200 can acquire the printer identification information from the printer 300 by NFC communication, and can transmit to the server 100 the printer identification information together with the mobile terminal identification information for identifying the mobile terminal 200, thereby sending the authentication request for determining whether the mobile terminal 200 is permitted to use the printer 300. Accordingly, when the authentication is successful, the mobile terminal 200 transmits the print data to the printer 300 via the wireless LAN 500, thereby executing printing.

According to the present embodiment, when the mobile terminal transmits the print data to the printer 300 to execute printing, the printer 300 to be used for the printing can be selected by placing the mobile terminal 200 close to the desired printer 300. Therefore, even if a plurality of printers 300 of the same model are located side by side, the user can reliably select the printer 300 to be used for the printing.

Further, according to the present embodiment, the server 100 centrally manages information necessary for performing the authentication process when the mobile terminal transmits the print data to the printer 300 to execute printing. Therefore, there is no need to store the serial numbers or like of the permitted mobile terminals 200 in each of printers 300. Workload for storing the serial numbers can be therefore omitted.

Furthermore, even if the mobile terminal 200 is stolen, the stolen mobile terminal 200 can be disabled in any printer 300 only by rewriting the information that is centrally managed on the server 100. Accordingly, the printing by the stolen mobile terminal 200 can be easily prevented.

Moreover, in case of a personnel change such as rearrangement or recruitment of clerks, the setting of which printer 300 is permitted to communicate with which mobile terminal 200 can be easily altered only by rewriting the information that is centrally managed on the server 100.

While it has been exemplified in the present embodiment that the mobile terminal 200 acquires the IP address of the printer 300 for which the authentication is successful, the present invention is not limited thereto. In another embodiment, the IP address may be stored in the NFC tag 306 together with the name of the printer 300. The NFC reader 209 may acquire the IP address together with the name of the printer 300, and may temporarily store the acquired IP address in the mobile terminal 200. Accordingly, when the server 100 succeeds in the authentication, the mobile terminal 200 can transmit the print data to the printer 300 that is identified by the IP address temporarily stored in the mobile terminal 200.

In this case, when the server 100 returns the authentication result of permission to the mobile terminal 200, the return of the IP address is not required. Therefore, the server 100 does not need to store the IP address of the printer 300 in the storage unit 103.

While it has been exemplified in the above embodiment that the matching information master 103c stored in the storage unit 103 (the matching information storage unit 12) is fixed, the present invention is not limited thereto. In another embodiment, it is possible to arbitrarily rewrite the contents of the matching information master 103c.

Figure 7:
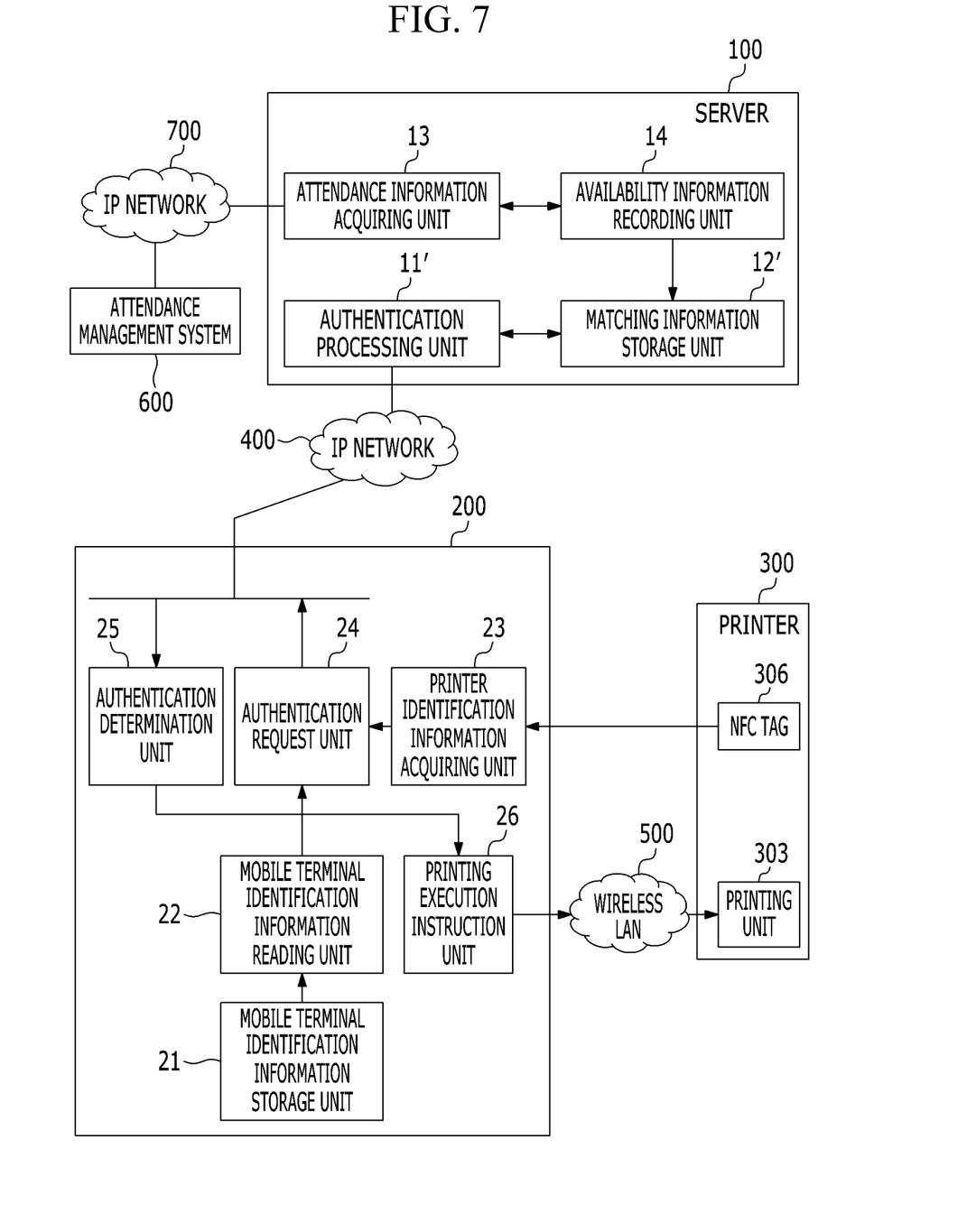
FIG. 7 is a block diagram exemplifying a network printing system according to another embodiment of the present invention.

FIG. 7 is a block diagram exemplifying a network printing system in the case that the contents of the matching information master 103c are frequently rewritten. In FIG. 7, since blocks denoted by the same reference numbers as shown in FIG. 4 have the same functions as blocks of FIG. 4, duplicated description will be omitted.

In an example shown in FIG. 7, the server 100 is connected to an attendance management system 600 via a local IP network 700. The server 100, as its functional structure, includes an authentication processing unit 11' and a matching information storage unit 12' in place of the authentication processing unit 11 and the matching information storage unit 12. The server 100 further includes an attendance information acquiring unit 13 and an availability information recording unit 14 in addition to the authentication processing unit 11' and the matching information storage unit 12'.

The attendance management system 600 is a system for managing the attendance of a plurality of users (for example, clerks of the store) using a plurality of mobile terminals 200. The attendance management system 600 stores clerk information on a plurality of clerks.

Figure 8:
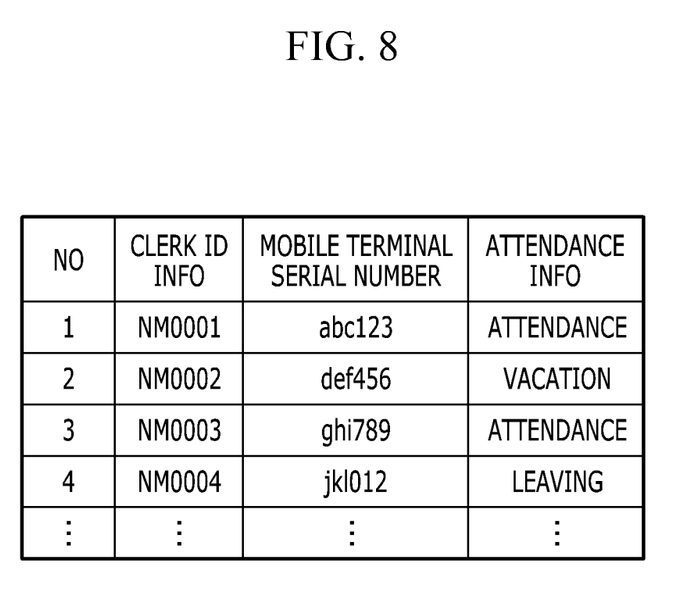
FIG. 8 is a diagram showing an example of clerk information stored in a time management system.

FIG. 8 is a diagram showing an example of clerk information stored in the attendance management system 600. As shown in FIG. 8, the clerk information includes clerk identification information for uniquely identifying a clerk, a serial number (mobile terminal identification information) of a mobile terminal 200 used by the clerk, and attendance information. The attendance information is registered as "attendance" when the clerk comes to the store and is registered "leaving" when the clerk leaves the store. In addition, the attendance information is registered as a "vacation" when the clerk has applied for a vacation in advance.

Figure 9:
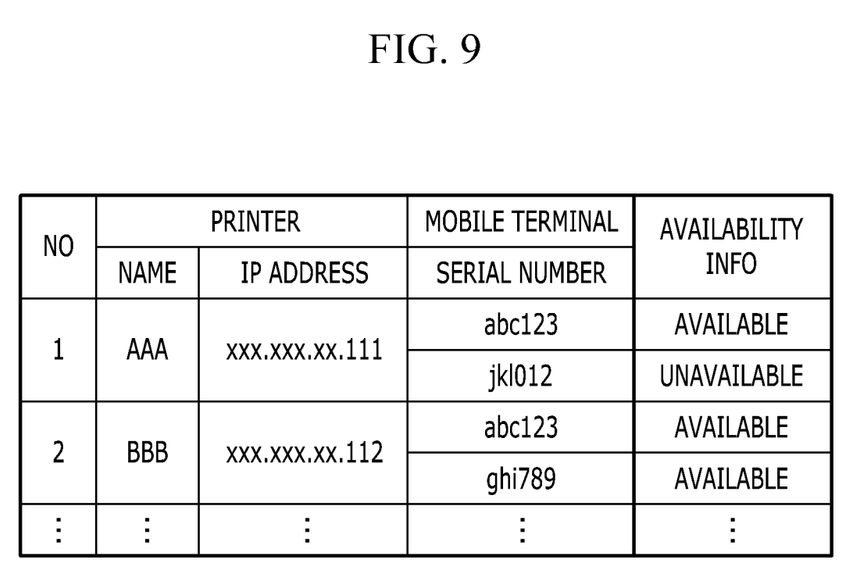
FIG. 9 is a diagram showing an example of information stored in a matching information storage unit according to another embodiment of the present invention.

FIG. 9 is a diagram showing an example of information stored in the matching information storage unit 12'. As shown in FIG. 9, the matching information storage unit 12' includes a name (printer identification information) of a printer 300, an IP address (address information) of the printer 300, serial number(s) (mobile terminal identification information) of one or more mobile terminals 200 permitted to communicate with the printer 300, and further stores availability information. The availability information will be described later.

The attendance information acquiring unit 13 acquires from the attendance management system 600 the attendance information of the clerk using the mobile terminal 200 together with the mobile terminal identification information. The availability information recording unit 14 stores availability information of the mobile terminal 200 depending on the acquired attendance information in the matching information storage unit 12 in association with the acquired mobile terminal identification information.

In detail, when the attendance information acquired by the attendance information acquiring unit 13 is "attendance", the availability information recording unit 14 stores information of "available" in the matching information storage unit 12' as the availability information of the mobile terminal 200. When the attendance information acquired by the attendance information acquiring unit 13 is "leaving" or "vacation", the availability information recording unit 14 stores information of "unavailable" in the matching information storage unit 12' as the availability information of the mobile terminal 200.

The authentication processing unit 11', in response to an authentication request by the authentication request unit 24, compares the combination of the mobile terminal identification information and the printer identification information sent from the mobile terminal 200 with the combination of the mobile terminal identification and the printer identification information stored in the matching information storage unit 12', and further checks the availability information stored in the matching information storage unit 12', thereby performing the authentication.

In detail, the authentication processing unit 11' determines whether the same combination is stored in the matching information storage unit 12'. When the same combination is stored in the matching information storage unit 12', the authentication processing unit 11' determines whether the availability information of the mobile terminal 200 that is stored in association with the combination is "available".

If the same combination is stored in the matching information storage unit 12', and the availability information of the mobile terminal 200 that is stored in association with the combination is "available", the authentication processing unit 11' returns the authentication result of "permission" to the mobile terminal 200. Otherwise, the authentication processing unit 11' returns the authentication result of "rejection" to the mobile terminal 200.

In this case, even if the combination of the mobile terminal identification information and the printer identification information is permitted, the mobile terminal 200 whose owner's attendance information is "leaving" or "vacation" is prohibited to use the printer 300. Therefore, even when the mobile terminal 200 is stolen after work or during vacation, the stolen mobile terminal 200 can be disabled on any printer 300 without rewriting the printer identification information or the mobile terminal identification information that is centrally managed on the server 100.

In recent years, BYOD (Bring Your Own Device) has been widespread. Accordingly, it is increasing that employees use their own mobile terminals at work. According to the above embodiment, even if the privately owned mobile terminal is used at work, the mobile terminal can be disabled if the employee has left the store or is on vacation. Therefore, the employee after work or during vacation cannot perform the settlement process on his or her own mobile terminal. As a result, an illegal settlement by the employee can be prevented.

While it has been exemplified in the above embodiment that the clerk identification information is previously associated with the serial number of the mobile terminal 200, the present invention is not limited thereto. In another embodiment, the clerk identification information shown in FIG. 8 may leave blank. The clerk may come to work and determine the mobile terminal 200 to be used on the day of the work by a predetermined operation. Accordingly, the mobile terminal 200 to which the clerk identification information is written can be used.

Further, while it has been exemplified in the above embodiment that the mobile terminal 200 acquires the printer identification information from the printer 300 by NFC communication, the present invention is not limited thereto. In another embodiment, a bar code may be attached to or printed on the printer 300, and may be captured by a camera of the mobile terminal 200. Accordingly, the mobile terminal 200 can acquire the printer identification information from the printer 300 identified by the bar code.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A network printing system comprising a server, a mobile terminal, and a printer connected to each other through a communication network:
   wherein the printer comprises a printer identification information storage unit configured to store printer identification information for identifying the printer,
   wherein the mobile terminal comprises:
      a mobile terminal identification information storage unit configured to store mobile terminal identification information for identifying the mobile terminal;
      a printer identification information acquiring unit configured to acquire the printer identification information stored in the printer identification information storage unit of the printer;
      an authentication request unit configured to request an authentication to the server by transmitting the mobile terminal identification information read from the mobile terminal identification information storage unit and the printer identification information acquired by the printer identification information acquiring unit;
      an authentication determination unit configured to determine whether the authentication is successful based on an authentication result returned from the server in response to the authentication request by the authentication request unit; and
      upon determining that the authentication is successful by the authentication determination unit, a printing execution instruction unit configured to transmit print data to the printer whose printer identification information is acquired by the printer identification information acquiring unit, and
   wherein the server comprises:
      a matching information storage unit configured to store the printer identification information of the printer in association with the mobile terminal identification information of the mobile terminal permitted to communicate with the printer; and
      upon receiving the authentication request from the authentication request unit of the mobile terminal, an authentication processing unit configured to perform the authentication by comparing the mobile terminal identification information and the printer identification information transmitted from the mobile terminal with the mobile terminal identification information and the printer identification information stored in the matching information storage unit, and to return the authentication result to the mobile terminal.

2. The network printing system of claim 1, wherein the print identification information acquiring unit of the mobile terminal is configured to acquire the printer identification information stored in the printer identification information storage unit of the printer by near field communication.

3. The network printing system of claim 2, wherein the matching information storage unit of the server is configured to further store address information of the printer corresponding to the printer identification information,
   wherein the authentication processing unit of the server is configured to further return the address information to the mobile terminal along with the authentication result, and
   wherein the printing execution instruction unit of the mobile terminal is configured to transmit the print data by a wireless local area network to the printer identified by the address information returned from the authentication processing unit.

4. The network printing system of claim 2, wherein the printer identification information storage unit of the printer is configured to further store address information of the printer,
   wherein the printer identification information acquiring unit of the mobile terminal is configured to further acquire the address information from the printer identification information storage unit together with the printer identification information, and wherein the printing execution instruction unit of the mobile terminal is configured to transmit the print data by a wireless local area network to the printer identified by the acquired address information.

5. The network printing system of claim 1, wherein the server further comprises:

an attendance information acquiring unit configured to acquire attendance information of a user of the mobile terminal together with the mobile terminal identification information; and an availability information recording unit configured to store availability information of the mobile terminal depending on the acquired attendance information in the matching information storage unit in association with the acquired mobile terminal identification information, wherein the authentication processing unit is configured to perform the authentication further by checking the availability information stored in the matching information storage unit.

6. The network printing system of claim 1, wherein the printer identification information acquiring unit of the mobile terminal is further configured to acquire the printer identification information stored in the printer identification information storage unit of the printer by capturing a bar code on the printer.

\* \* \* \* \*